(12) United States Patent
Raye et al.

(10) Patent No.: US 11,598,451 B2
(45) Date of Patent: *Mar. 7, 2023

(54) MANIFOLD SYSTEM

(71) Applicants: Victor J. Raye, Kansas City, MO (US); Jerry J. Donovan, Shawnee, KS (US)

(72) Inventors: Victor J. Raye, Kansas City, MO (US); Jerry J. Donovan, Shawnee, KS (US)

(73) Assignee: Haldex Brake Products Corporation, Kansas City, MO (US)

( * ) Notice: Subject to any disclaimer, the term of this patent is extended or adjusted under 35 U.S.C. 154(b) by 254 days.

This patent is subject to a terminal disclaimer.

(21) Appl. No.: 16/850,879

(22) Filed: Apr. 16, 2020

(65) Prior Publication Data
US 2020/0240553 A1 Jul. 30, 2020

Related U.S. Application Data

(63) Continuation of application No. 15/796,186, filed on Oct. 27, 2017, now Pat. No. 10,690,269, which is a (Continued)

(51) Int. Cl.
*F16L 5/14* (2006.01)
*F16B 2/06* (2006.01)

(52) U.S. Cl.
CPC .............. *F16L 5/14* (2013.01); *F16B 2/065* (2013.01); *Y10T 403/75* (2015.01)

(58) Field of Classification Search
CPC . F16L 5/14; F16L 41/025; F16L 41/03; F16L 3/006
See application file for complete search history.

(56) References Cited

U.S. PATENT DOCUMENTS 2,069,238 A 2/1937 Fraser
2,763,419 A 9/1956 Brown
(Continued)

FOREIGN PATENT DOCUMENTS

| CA | 2678228 A1 | 4/2010 |
| DE | 29604707 U1 | 4/1996 |
| EP | 2180226 A1 | 4/2010 |

OTHER PUBLICATIONS

English machine translation of the Description portion of EP2180226 https://worldwide.espacenet.com/publicationDetails/description?CC=EP&NR=2180226A1&KC=A1&FT=D&ND=3&date=20100428&DB=&locale=en_EP.

*Primary Examiner* — Zachary T Dragicevich
*Assistant Examiner* — James A Linford
(74) *Attorney, Agent, or Firm* — St. Onge Steward Johnston and Reens LLC

(57) ABSTRACT

A manifold system with a manifold body having a length greater than a width and a height of the manifold body, a top surface with a first groove extending along a length of the manifold body, a bottom surface with a second groove extending along a length of the manifold body, at least one mounting hole extending through one of a first side surface or a second side surface of the manifold body and through one of the first groove or the second groove, a plurality of connection fittings including at least one connection fitting on each of the first and second side surfaces of the manifold body, at least one internal passage way within the manifold body fluidly connecting at least two of the plurality of connection fittings, and at least one fastening element removably engaged within the at least one mounting hole.

17 Claims, 6 Drawing Sheets

Related U.S. Application Data continuation of application No. 12/730,923, filed on Mar. 24, 2010, now Pat. No. 9,829,121.

(56)  References Cited

U.S. PATENT DOCUMENTS

| | | | |
|---|---|---|---|
| 3,232,568 A | | 2/1966 | Lennon |
| 3,516,691 A | * | 6/1970 | Williams ................ F16L 39/00 |
| | | | 285/242 |
| 3,728,470 A | | 4/1973 | Maier |
| 3,817,688 A | | 6/1974 | Shadley |
| 3,869,152 A | | 3/1975 | DeVincent et al. |
| 3,888,518 A | * | 6/1975 | Delessert ................ F16L 37/56 |
| | | | 285/70 |
| 4,913,189 A | | 4/1990 | Kline et al. |
| 4,915,419 A | | 4/1990 | Smith, III |
| 5,046,786 A | | 9/1991 | Johnston et al. |
| 5,372,392 A | | 12/1994 | Dunn et al. |
| 5,725,255 A | | 3/1998 | Hayashi et al. |
| D427,284 S | | 6/2000 | Sato et al. |
| 6,264,286 B1 | | 7/2001 | Ehrlich et al. |
| 6,866,300 B2 | | 3/2005 | Hayes et al. |
| 7,207,602 B2 | | 4/2007 | Burian et al. |
| 8,973,615 B2 | | 3/2015 | Hoshi et al. |
| 2003/0019649 A1 | | 1/2003 | Rubenstein et al. |
| 2009/0199918 A1 | * | 8/2009 | Steinfels ................ F04B 35/06 |
| | | | 137/881 |
| 2010/0215429 A1 | | 8/2010 | Raye et al. |
| 2011/0220224 A1 | | 9/2011 | Ellis |

* cited by examiner

MANIFOLD SYSTEM

FIELD OF THE INVENTION

The present invention relates to a system module and manifold system that are easily removable and mounted to a trailer vehicle.

BACKGROUND OF THE INVENTION

Tractor-Trailer and/or dolly vehicles are used to transport large quantities of cargo across the United States. Various industries and consumers are dependent upon these trailer/dolly vehicles for the transport of their goods. In particular, the shipping industry, including large companies such as UPS®, FedEx®, and the United States Postal Service® among others, utilize trailer/dolly vehicles to transport and ship goods to consumers. These vehicles help the shipping industry adequately transport goods in order to meet the demand of US consumers, which require huge volumes of goods to be shipped daily.

What makes trailer/dolly vehicles unique is that these vehicles are constantly being used and operated. Companies try to maximize use of trailer/dolly vehicles, as this allows companies to fully allocate their resources and limit costs. In fact, companies work under the operational model whereby trailer/dolly vehicles are in constant use. This saves the industry thousands, if not millions, of dollars in operational savings.

Inevitably, however, trailer/dolly vehicles must be serviced, which results in trailer/dolly downtime. Servicing trailer/dolly vehicles disrupts the operational model of shipping companies, and results in monetary and operational losses, as shipping companies cannot maximize the efficiency of their trailer/dolly vehicles. These companies, which still must meet consumer demand, then need to compensate for servicing delays by purchasing additional trailer/dolly vehicles or by renting additional trailer/dolly vehicles from another company. In both instances, these inefficiencies due to trailer/dolly downtime costs companies time and money.

Thus, it is desirable to avoid such trailer/dolly vehicle downtime, especially periodic causes of downtime for these vehicles. One such periodic cause of trailer/dolly downtime could be the failure of an Anti-Lock Brake (ABS) module. Other such periodic causes of trailer/dolly downtime could be the failure of the Booster Valve, the Pressure Protection Valve, or any other such valve in the trailer/dolly, as well as the trailer/dolly control and hydraulic systems. These components are typically located mounted on a manifold system, which is located within the system module that is attached to the trailer/dolly vehicle.

It is thus desirable to reduce, if not limit entirely, the amount of trailer/dolly vehicle downtime because of downtime due to the trailer/dolly system module or manifold system.

Prior art designs of such system modules and manifold system attached to system modules required the entire trailer/dolly vehicle to be inoperable if a problem within the system module or manifold system occurred. Thus, when the system module or manifold system located within the system module had to be replaced, the entire trailer/dolly vehicle would be inoperable and could not be used, resulting in the delays and inefficiencies described above. Furthermore, prior art designs of system modules and manifold systems for trailer/dolly systems have greater failure rates as these prior art designs are difficult to access and fix, because these system modules containing manifold systems are not easily removable.

What is thus desired, therefore, is an apparatus and method for providing a system module and manifold system that may be easily removable and replaced, so that trailer/dolly vehicle downtime is minimized. What is further desired is a system module and manifold system that may be easily removed, so that if a problem is detected in the system module or manifold system, the system module and/or manifold system may be quickly replaced with another system module and/or manifold system, allowing for continued use of the trailer/dolly vehicle and minimizing downtime.

What is further desired is for the manifold system to be easily installed and adaptable with a system module, the system module being attached to a trailer/dolly vehicle. What is further desired is that the manifold system may be inserted into a slot within a trailer/dolly system module and may be slidable within this slot. It is further desired for the manifold system to be attached or secured to the system module by using fasteners.

What is further desired is for the manifold system to use multiple passage ways internal to the manifold system that minimize fittings and connections and simplify plumbing with other components on the system module in order to reduce leakage points and speed up assembly time. Furthermore, it is desired for the manifold system to connect various valves to one another within a system module and for the manifold system to use a boot to protect certain valve components from contamination.

SUMMARY OF THE INVENTION

Accordingly, it is an object of the present invention to provide an apparatus and method for providing a manifold system that can be easily be removed and replaced to minimize trailer/dolly downtime.

It is a further object of the present invention to provide a manifold system that may be easily removed, so that if a problem is detected in the manifold system, the manifold system may be quickly replaced with another manifold system, allowing for continued use of the trailer/dolly vehicle.

It is a further object of the present invention for the manifold system to be easily installed and to be adaptable with the system module, so that the manifold system may be used by the system module.

It is a further object for the manifold system to be inserted into a slot within the system module and to be slidable within this slot. It is a further object of the present invention for the manifold system to be attached or secured to the system module by using fasteners.

It is a further object for the manifold system to use multiple passage ways internal to the manifold system that minimize fittings and connections and simplify plumbing with other components on the system module.

It is a further object of the invention for the manifold system to reduce leakage points and speed up assembly/installation time of the system module. It is a further object of the invention to eliminate installation error of the manifold system, thus minimizing operation cost in both early and unnecessary repair and replacement cost, as well as minimizing catastrophic failures, which results in insurance cost saving. It is a further object of the invention for the manifold system to reduce diagnostic and repair time compared to prior art manifold system designs.

It is a further object of the present invention for the manifold system to connect various valves to one another within a system module. It is a further object of the invention for the manifold system to use a boot to protect certain valve components from contamination, such as Road Salt, Sand, Dirt, Moisture, and Mag-Chloride.

It is a further object of the present invention for the manifold system to be made out of Plastic, Steel, Aluminum, Composite, or a Casting.

These and other objectives are achieved by providing a manifold system for a trailer system module comprising: a body having at least one mounting hole and at least one groove for attachment to the trailer system module, and at least one fastening element, wherein upon attachment of the manifold system to the trailer system module, the at least one groove is fitted to an attachment element of the trailer system module and the at least one fastening element fastens the body to the attachment element via the at least one mounting hole.

The manifold system may be removable from the trailer system module by removing the at least one fastening element. The manifold system also may be detached from the trailer system module and may be repaired without disturbing the continued use of a trailer vehicle.

The manifold system may be replaced by a second manifold system. Additionally, the attachment element on the trailer system module may be a slot for supporting the manifold system, the manifold system fitting into said slot.

The manifold system may be made from a group of materials consisting of aluminum, casting, engineering plastics, metal, steel, or a combination thereof. The manifold system may have two grooves and may further have at least one valve and/or fitting.

The manifold system may further have multiple passageways internal to the manifold system that minimize fittings, connections and/or simplify plumbing of the trailer system module. Optionally, the manifold system may further have a boot to protect said manifold system from contamination.

Other objectives of the invention are met by providing a method for installing a manifold system on a trailer system module comprising: introducing the manifold system; introducing a mounting element on the trailer system module; attaching the manifold system to said mounting element; and fastening the manifold system to said mounting element via external fasteners.

The method may have the mounting element described in the method further comprise a slot, wherein the manifold system slides into said slot.

The method may further comprise the steps of unfastening said external fasteners; removing the manifold system from said mounting element; attaching a second manifold system to said mounting element; and fastening the second manifold system to said mounting element via said external fasteners.

The manifold system in the method may further comprise at least one valve and the method may further comprise the step of attaching the at least one valve of the manifold system to plumbing in the system module.

Other objectives of the invention are met by providing a trailer system comprising: a trailer system module having a mounting surface, a manifold system, and at least one mounting element, wherein said at least one mounting element attaches said manifold system to said trailer system module at said mounting surface.

The mounting surface may be located within a trailer vehicle. The manifold system may also be removable from the mounting surface.

Additionally, the trailer system may further comprise at least one fastening element allowing for the manifold system to be fastened to the mounting surface.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 2 is a end perspective view of the embodiment shown in

FIG. 1;

FIG. 3 is a rear perspective view of the embodiment shown in

FIG. 1;

DETAILED DESCRIPTION OF THE INVENTION

Figure 1:
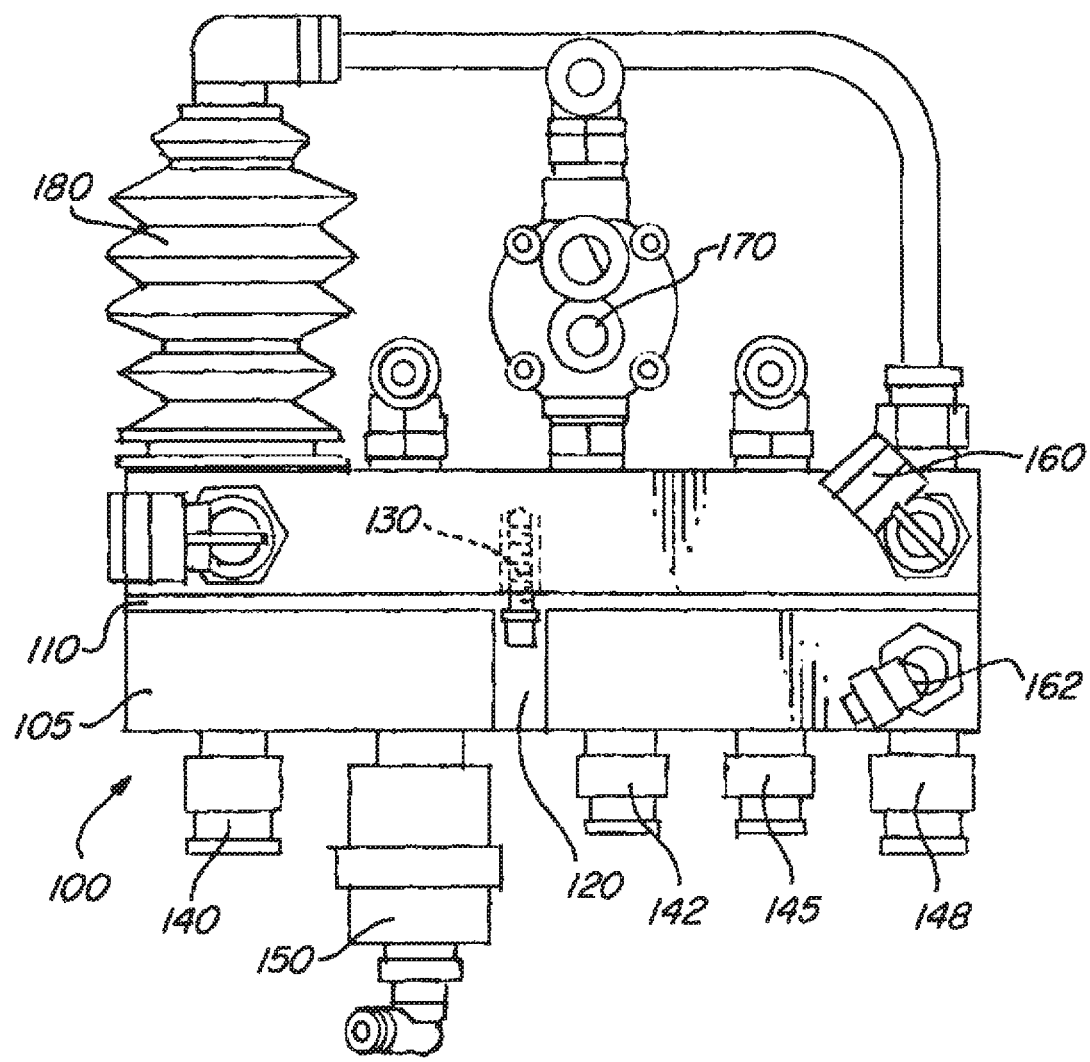
FIG. 1 is a top perspective view of an embodiment of the invention.

FIG. 1 shows manifold system 100 with body 105 having groove 110 and mounting hole 120. Screw 130 is shown in phantom illustrating that it may be screwed through mounting hole 120. Screw 130 is an example of a fastener or fastening means that allows manifold system 100 to be secured to a system module. While only one screw and one mounting hole is shown in FIG. 1, this is not meant to limit the amount of screws (fasteners) and/or mounting holes present for this invention. Additionally, while only 1 groove is shown, additional grooves, such as the lower groove shown in FIGS. 2 and 5, and even a third, fourth, or fifth groove, may also be included to secure manifold system 100 to a system module. These groove(s) or plurality of grooves allow manifold system 100 to be slidable and allow manifold system 100 to engage the attachment element (shown as a panel in FIGS. 4-6) of the system module.

FIG. 1 also shows various components of manifold system 100 such as straight fitting(s) 140, 142, 145 and 148, one way check valve 150, ninety degree fitting(s) 160 and 162, pressure protection valve 170, and pressure protection valve with boot 180. These elements can interact with various connections on the system module allowing for minimizing fittings and connections and simplifying plumbing with other components on the system module in order to reduce leakage points and speed up assembly time. The connections of the valves and fittings to elements in the system module are not shown.

Figure 2:
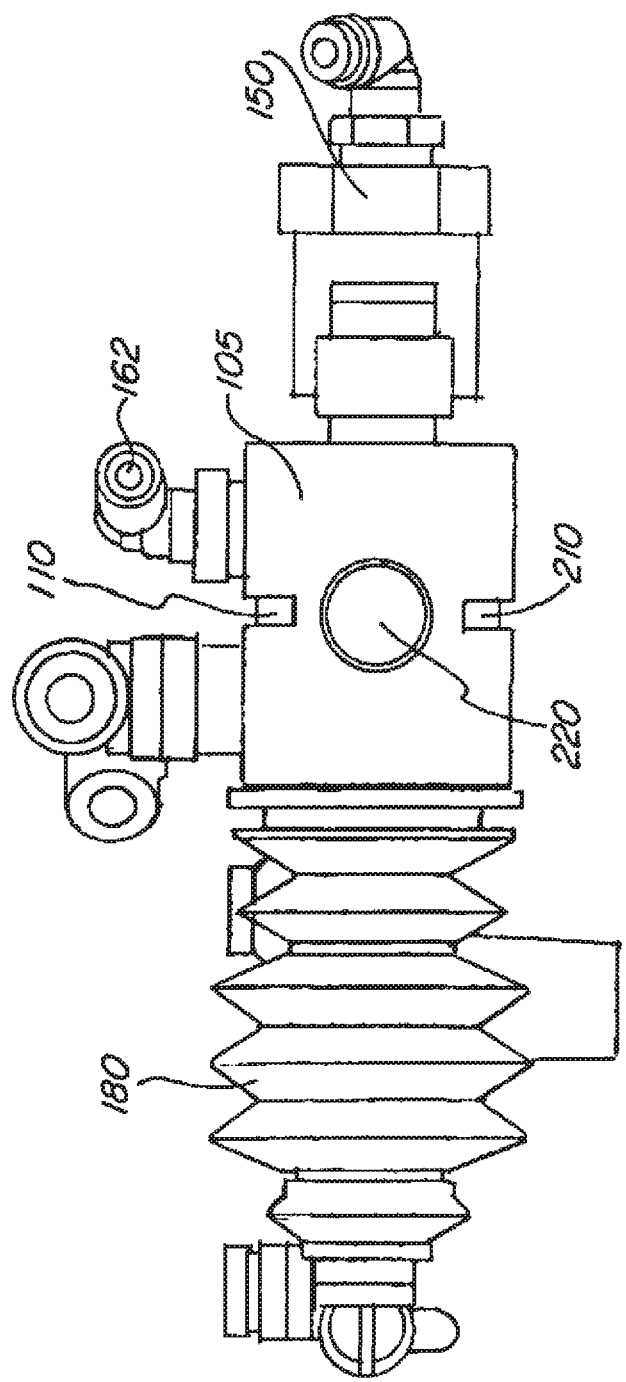

FIG. 2 shows an end view of manifold system 100 shown in FIG. 1. Here, groove 110 and lower groove 210 are shown located on body 105 of manifold system 100. One way check valve 150, pressure protection valve with boot 180, ninety degree fitting 162, and pipe plug 220 are also shown in this view. These elements may connect to various connections on the system module.

Figure 3:
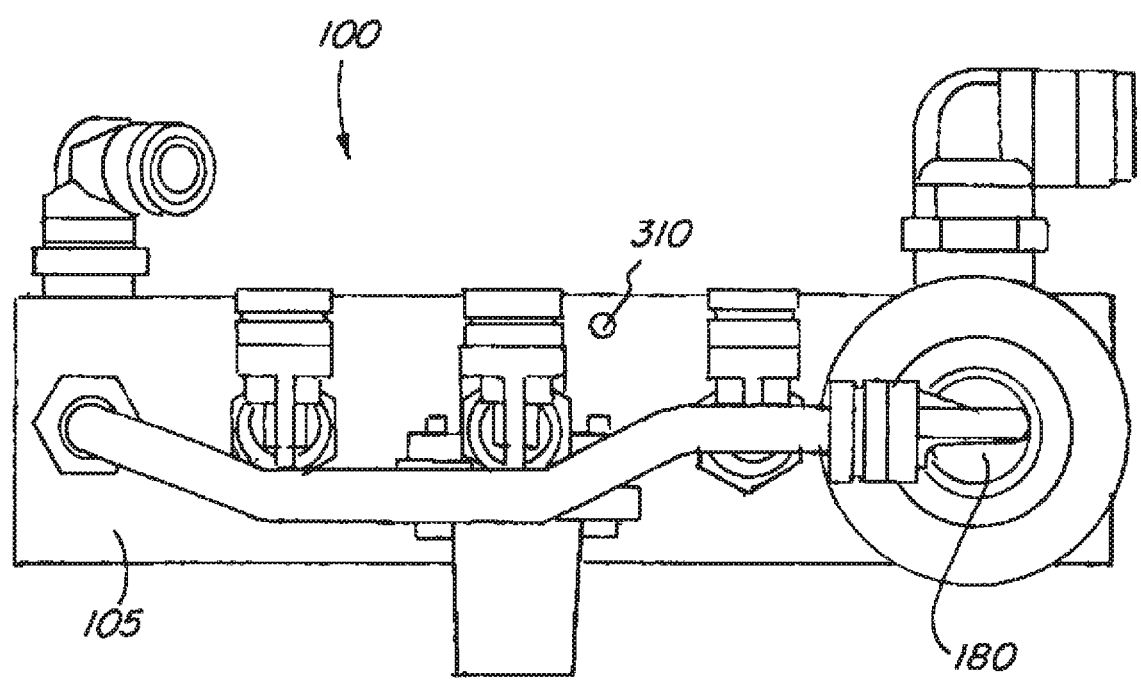

FIG. 3 is a rear view of manifold system 100 with body 105 showing mounting hole 310, which allows for fasteners, such as screws (not shown) to secure manifold system 100 to system module 400 (not shown).

Figure 4:
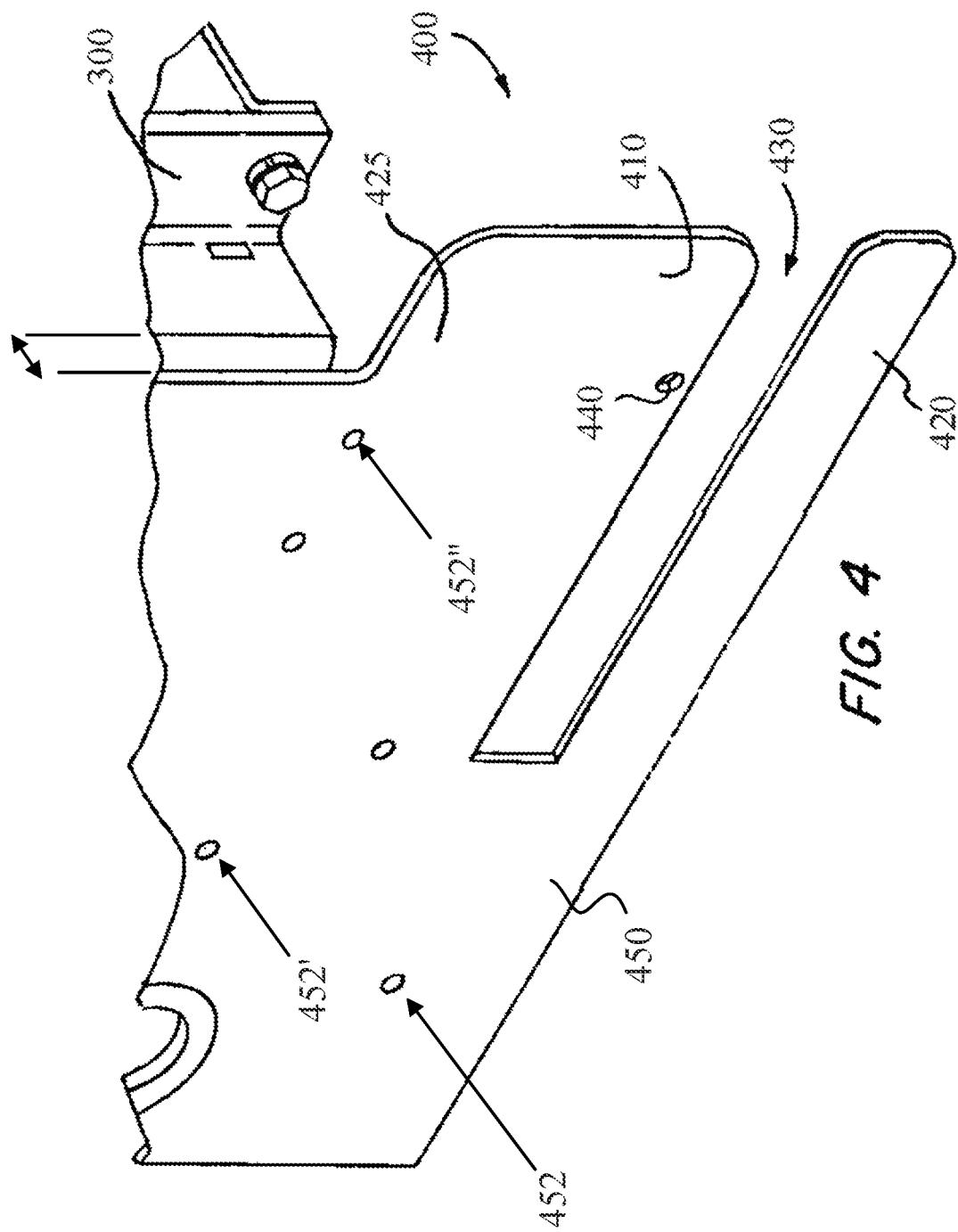
FIG. 4 is a perspective view of the attachment/slot portion of the system module.

FIG. 4 shows the system module 400 including a module panel 450 having attachment element 410. Attachment element 410 is shown as part of part of module panel 450 having lower region 420 where the space between the upper part or region 425 of attachment element 410 and lower region 420 forms slot 430. Manifold system 100 may slide into the slot formed by attachment element 410 (shown in FIG. 5). This is because the grooves on manifold system 100 have a width which corresponds to the width of attachment element 410 and 420 of system module 400.

Additionally, system module 400 includes mounting hole 440, allowing for screws (not shown) to secure manifold system 100 to system module 400. While only one mounting hole is shown, various mounting holes may be present within system module 400, corresponding to various mounting holes in manifold system 100. FIG. 4 also shows the system module 400 including module panel 450 being attached to a trailer vehicle 300 by means of various mounting holes 452, 452',452" allowing for bolts (not shown) to secure the module panel to the vehicle frame, such that the manifold system 400 including module panel 450 is able to be removed and repaired during use of the use of the trailer vehicle.

Figure 5:
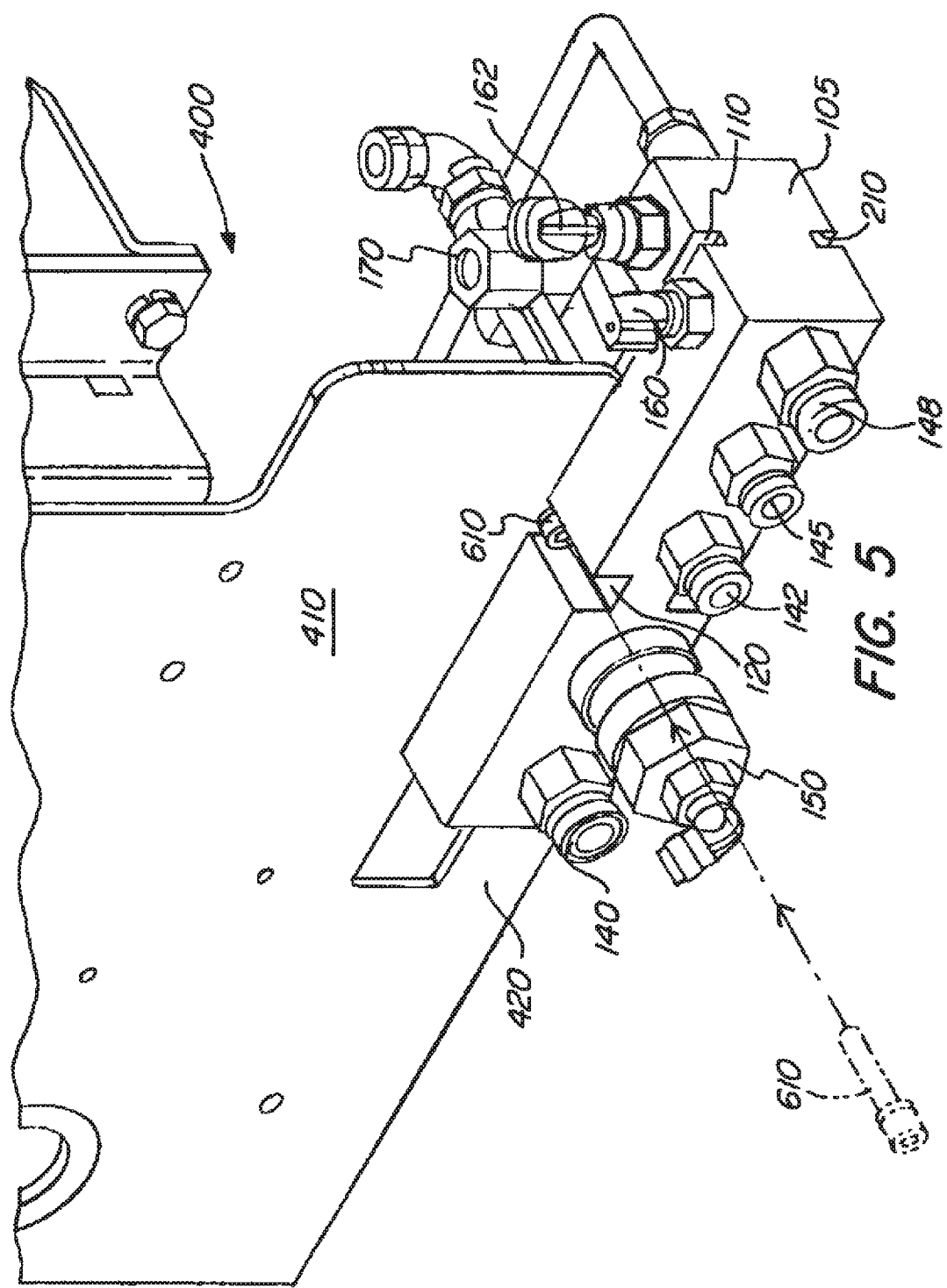
FIG. 5 is a perspective view of the manifold system being adaptable to the attachment/slot portion of the system module shown in FIG. 4.

FIG. 5 shows manifold system 100 secured into system module 400 through attachment element 410 by fastener 610. Additionally, in FIG. 5, groove 110 and lower groove 210 are shown interacting with attachment element 410 and lower attachment element 420. These grooves correspond to attachment element 410 and 420, allowing for body 105 of manifold system 100 to be supported, and allowing for manifold system 100 to slide into slot 430 formed by attachment element 410 and 420. Furthermore, screw 610, shown in phantom and in a fastening position, is able to secure body 105 of manifold system 100 to attachment element 410 and to system module 400. While shown as a screw, fastener 610 may be any other such fastening means known in the art.

The ability of manifold system 100 to be quickly and easily fastened and/or unfastened, and then slid off from attachment element 410, allows manifold system 100 to be easily removed and/or attached to system module 400. This design allows for the various advantages of the manifold system listed above.

Additionally, FIG. 5 shows the various components of manifold system 100 including straight fitting(s) 140, 142, 145 and 148, one way check valve 150, 90 Degree fitting(s) 160 and 162, pressure protection valve 170.

Figure 6:
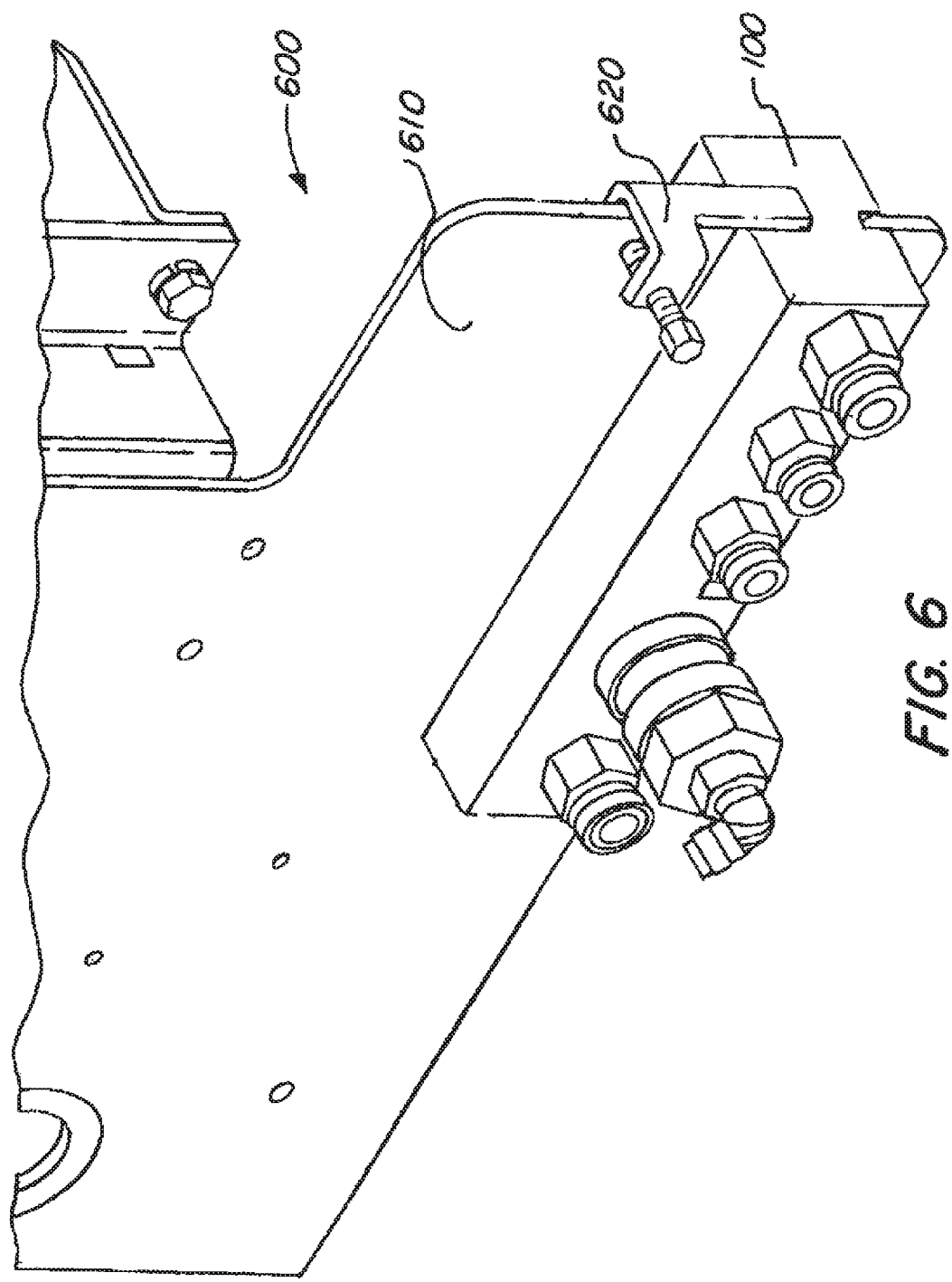
FIG. 6 is an alternative perspective view of the manifold system being adaptable to the attachment/slot portion of the system module having a fastening orientation from the one disclosed in FIG. 5.

FIG. 6 shows another embodiment of the invention where manifold system 100 is attached to system module 600 having attachment element 610, where manifold system 100 fits into attachment element 610. Here, fastening element 620 is shown as a clamp, allowing for manifold system 100 to be clamped to system module 600.

In other embodiments of the invention, a combination of a clamp, clamping means, and/or fasteners may be used to secure manifold system 100 to attachment element 410 of system module 400.

In other embodiments not shown in the figures, additional fasteners and/or grooves may be used to secure the manifold system to the attachment element on the system module panel.

The embodiments of the invention allow for a manifold system to be quickly replaced by another manifold system allowing for continued use of the trailer/dolly vehicle. The invention further allows for a reduction in installation time of the manifold system, and helps eliminate installation error of the manifold system, thus minimizing operation cost in both early and unnecessary repair and replacement cost, as well as minimizing catastrophic failures resulting in insurance cost saving.

The manifold system also provides increased ease of use, durability, and longevity, as it attaches to the panel on the system module of the trailer/dolly.

The manifold system may be made of aluminum, casting, engineering plastics, and various other materials known in the art.

Additionally, the manifold system may be fastened such that its longitudinal axis is completely surrounded by the attachment element as shown in FIG. 6 or partially surrounded by the attachment element as shown in FIG. 5.

While the invention has been specifically described in connection with certain specific embodiments thereof, it is to be understood that this is by way of illustration and not of limitation and that various changes and modifications in form and details can be made thereto, and the scope of the appended Claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A trailer/dolly vehicle manifold system, comprising:
    a manifold body having a top surface, a bottom surface, a first side surface, and a second side surface, said manifold body having a longitudinal length defined by a first end and a second end;
    a groove positioned in either the top or bottom surface of said manifold body and extending along at least a portion of the longitudinal length of said manifold body;
    at least one mounting hole extending through the first side surface of said manifold body and through the groove such that said at least one mounting hole extends substantially perpendicular to the longitudinal axis of the manifold body;
    a plurality of connection fittings including at least one connection fitting located on each of the first and second side surfaces and the top surface of said manifold body and no connection fittings are positioned on the first or second ends or the bottom surface of the manifold body;
    at least one internal passageway within said manifold body fluidly connecting at least two of said plurality of connection fittings;
    at least one fastening element removably engaged within said at least one mounting hole; and
    wherein said manifold body is adapted to slideably engage with a module panel having an edge, the edge adapted to engage with the groove along a length of said manifold body and the at least one fastening element detachably fastens said manifold body to the module panel.

2. The trailer/dolly vehicle manifold system of claim 1, wherein said plurality of connection fittings further includes at least two connection fittings on the top surface of said manifold body.

3. The trailer/dolly vehicle manifold system of claim 1, wherein said manifold body is fabricated from a group of materials consisting of aluminum, casting, engineering plastics, metal, steel, or a combination thereof.

4. The trailer/dolly vehicle manifold system of claim 1, further comprising a pressure protection valve attached to said manifold body and a boot enclosing the pressure protection valve.

5. The trailer/dolly vehicle manifold system of claim 1, wherein at least one of said plurality of connection fittings is selected from a group consisting of a straight fitting and a ninety-degree fitting.

6. The trailer/dolly vehicle manifold system of claim 1, further comprising at least one valve coupled to one of said plurality of connection fittings.

7. The trailer/dolly vehicle manifold system of claim 6, wherein said at least one valve is selected from the group consisting of a check valve and a pressure protection valve.

8. The trailer/dolly vehicle manifold system of claim 1, wherein said groove comprises a first groove and said edge comprises a first edge, the system further comprising:
   a second groove positioned on either the top or bottom surface of said manifold body opposite said first groove;
   said second groove adapted to slideably engage with a second edge of the module panel;
   wherein the first and second edges simultaneously engage with the first and second grooves when said manifold body is slideably engaged with said module panel.

9. The trailer/dolly vehicle manifold system of claim 1, wherein the first and second grooves extend along an entire length of said manifold body.

10. The trailer/dolly vehicle manifold system of claim 1, wherein said manifold body has a length greater than a width and the length is greater than the height.

11. The trailer/dolly vehicle manifold system of claim 1, wherein said module panel is substantially flat.

12. The trailer/dolly vehicle manifold system of claim 1, wherein said module panel is removably mounted to a trailer/dolly vehicle frame.

13. A trailer/dolly vehicle manifold system, comprising:
   a manifold body defined by top, bottom, first side, second side, first end and second end surfaces;
   a groove positioned in either the top or bottom surface of said manifold body and extending along at least a portion of a length of said manifold body and a mounting hole extending through the groove;
   a plurality of connection fittings including at least one connection fitting located on each of the first side, the second side and the top surfaces;
   wherein no connection fittings are positioned on the first or second end surfaces or the bottom surface;
   an internal passageway within said manifold body fluidly connecting at least two of said plurality of connection fittings; and
   wherein said manifold body is adapted to slideably engage with a module panel having an edge, the edge adapted to engage with the groove.

14. The trailer/dolly vehicle manifold system of claim 13, further comprising at least one valve coupled to one of said plurality of connection fittings.

15. The trailer/dolly vehicle manifold system of claim 14, wherein said at least one valve is selected from the group consisting of a check valve and a pressure protection valve.

16. The trailer/dolly vehicle manifold system of claim 13, further comprising
   a fastening element removably engaged within said mounting hole.

17. The trailer/dolly vehicle manifold system of claim 16, wherein said module panel is removably mounted to a trailer/dolly vehicle frame.

\* \* \* \* \*